(12) United States Patent
Shoji et al.

(10) Patent No.: US 7,667,726 B2
(45) Date of Patent: Feb. 23, 2010

(54) OPTICAL WRITING UNIT AND AN IMAGE FORMING APPARATUS INCLUDING THE SAME

(75) Inventors: Katsunori Shoji, Chigasaki (JP);
Takeshi Yamakawa, Fujisawa (JP);
Hiroshi Yoshizawa, Kawasaki (JP)

(73) Assignee: Ricoh Co., Ltd., Tokyo (JP)

( * ) Notice: Subject to any disclaimer, the term of this patent is extended or adjusted under 35 U.S.C. 154(b) by 145 days.

(21) Appl. No.: 11/639,417

(22) Filed: Dec. 15, 2006

(65) Prior Publication Data

US 2007/0139745 A1      Jun. 21, 2007

(30) Foreign Application Priority Data

Dec. 16, 2005    (JP) ............... 2005-363142

(51) Int. Cl.
*B41J 15/14*     (2006.01)
*G02B 26/08*    (2006.01)
(52) U.S. Cl. ...................... 347/241; 359/216
(58) Field of Classification Search ............. None
See application file for complete search history.

(56) References Cited

U.S. PATENT DOCUMENTS

| | | | |
|---|---|---|---|
| 4,469,430 A * | 9/1984 | Terashima | ........... 347/134 |
| 5,587,813 A | 12/1996 | Yamazaki | |
| 6,072,516 A | 6/2000 | Yamakawa | |
| 6,236,418 B1 | 5/2001 | Yamakawa | |
| 6,243,128 B1 | 6/2001 | Yamakawa | |
| 6,339,491 B1 | 1/2002 | Kondou et al. | |
| 6,593,951 B2 | 7/2003 | Yokoyama | |
| 6,829,001 B2 | 12/2004 | Yamakawa | |
| 7,057,780 B2 | 6/2006 | Yoshizawa | |
| 2003/0231364 A1 | 12/2003 | Shoji et al. | |
| 2005/0012974 A1 | 1/2005 | Ono | |
| 2005/0052719 A1 | 3/2005 | Tomita | |
| 2006/0209376 A1 | 9/2006 | Yamakawa | |

FOREIGN PATENT DOCUMENTS

| | | | |
|---|---|---|---|
| JP | 11-183836 | | 7/1999 |
| JP | 11183836 A | * | 7/1999 |
| JP | 11-218710 | | 8/1999 |
| JP | 11264949 A | * | 9/1999 |
| JP | 11-281909 | | 10/1999 |
| JP | 2000-356753 | | 12/2000 |
| JP | 2002-162585 | | 6/2002 |
| JP | 2002-214558 | | 7/2002 |
| JP | 2003-167110 | | 6/2003 |

OTHER PUBLICATIONS

European Patent Office Search Report dated Apr. 3, 2007, for corresponding European Patent Application No. 06025821.7-2217.

* cited by examiner

*Primary Examiner*—Matthew Luu
*Assistant Examiner*—Kendrick X Liu
(74) *Attorney, Agent, or Firm*—Harness, Dickey & Pierce

(57) ABSTRACT

An optical writing unit, e.g., that can be included in an image forming apparatus includes a housing within which are disposed additional components of the optical writing unit including the following, a plurality of optical elements, a polygon mirror configured to deflect a laser light beam, and a collecting member configured to collect dust in the housing.

9 Claims, 4 Drawing Sheets

OPTICAL WRITING UNIT AND AN IMAGE FORMING APPARATUS INCLUDING THE SAME

PRIORITY STATEMENT

The present patent application claims priority under 35 U.S.C. §119 upon Japanese patent application No. 2005-363142, filed in the Japan Patent Office on Dec. 16, 2005, the contents and disclosure of which is hereby incorporated by reference herein in its entirety.

DISCUSSION OF THE RELATED ART

Related art image forming apparatuses, such as laser printers and digital copiers, generally include an optical writing unit. The optical writing unit includes a housing that accommodates a plurality of optical elements and a polygon mirror that deflects a laser light beam.

Referring to FIG. 1, a polygon mirror 120 used in an optical writing unit of a related art image forming apparatus is described.

The polygon mirror 120 of FIG. 1 has a hexagonal planar shape and is rotated in a counterclockwise direction, which is in a direction indicated by arrow "X" shown in FIG. 1. The polygon mirror 120 has a plurality of angled corners. Each angled corner includes upstream and downstream surfaces with respect to the rotation direction "X" of the polygon mirror 120. In FIG. 1, the downstream surface is represented by "A", and the upstream surface is represented by "B."

When the polygon mirror 120 is rotated in the direction indicated by arrow "X" as shown in FIG. 1, a turbulent flow is generated due to a low pressure condition of air. The turbulent flow, which is indicated by "TF" in FIG. 1, can stir powder dust and fine particles that reside in the air in the optical writing unit. The stirred powder dust and fine particles collide or hit against the downstream surface "A" of the polygon mirror 120 and adhere to the polygon mirror 120. The collision of powder dust and fine particles to the polygon mirror 120 has contaminated the downstream surface of the polygon mirror 120. The contamination of the polygon mirror 120 has resulted in a decrease of reflectivity of the polygon mirror 120 and a deterioration of image quality.

To reduce the above-described disadvantages, some techniques have been used.

One of the techniques has included the following structure of an optical writing unit. In the optical writing unit, the upstream surface "B" of the polygon mirror 120 is used instead of the downstream surface "A" when a synchronous detection is performed to control an exposure timing in a main scanning direction of the polygon mirror 120. The above-described operation is performed since the polygon mirror 120 or other polygon mirrors having a simple structure cannot easily remove contamination adhered thereto.

However, once the quality of images is deteriorated, the polygon mirror 120 needs to be cleaned or replaced. This has caused an increase of costs.

A different one of the techniques has been proposed to electrically discharge the polygon mirror 120 so as to reduce if not prevent contamination of the polygon mirror 120.

However, the discharge of electric charge from the polygon mirror 120 has not sufficiently removed the contamination caused by the turbulent flow.

SUMMARY

At least one embodiment of the present invention has been made, taking the above-mentioned circumstances into consideration.

At least one embodiment of the present invention provides an optical writing unit that includes a housing within which are disposed additional components of the optical writing unit including the following, a plurality of optical elements, a polygon mirror configured to deflect a laser light beam, and a collecting member configured to collect dust in the housing.

At least one embodiment of the present invention provides an image forming system that includes the above-described optical writing unit to expose an image bearing member to a laser light beam.

Additional features and advantages of the present invention will be more fully apparent from the following detailed description of example embodiments, the accompanying drawings and the associated claims.

BRIEF DESCRIPTION OF THE DRAWINGS

The accompanying drawings are intended to depict example embodiments of the present invention and should not be interpreted to limit the scope thereof. The accompanying drawings are not to be considered as drawn to scale unless explicitly noted.

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EXAMPLE EMBODIMENTS

Figure 1:
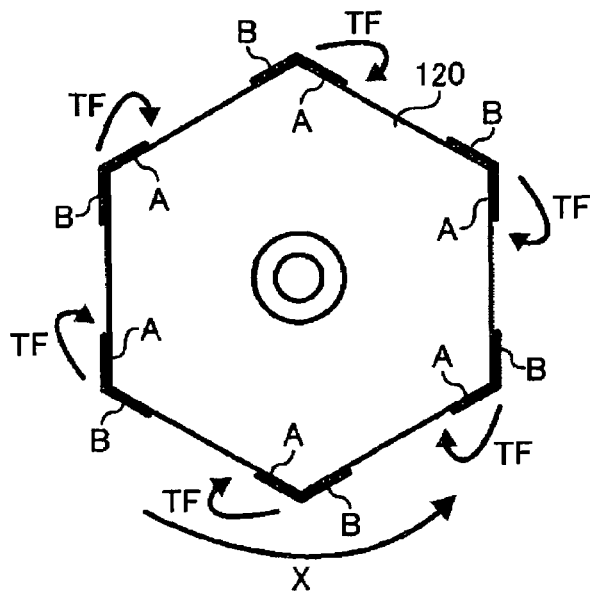
FIG. 1 depicts a structure of a polygon mirror according to the Related Art.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would hen be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to described various elements, components, regions, layers and/or sections, it should be understood that these elements, components, regions, layer and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, example embodiments of the present invention are described.

Figure 2:
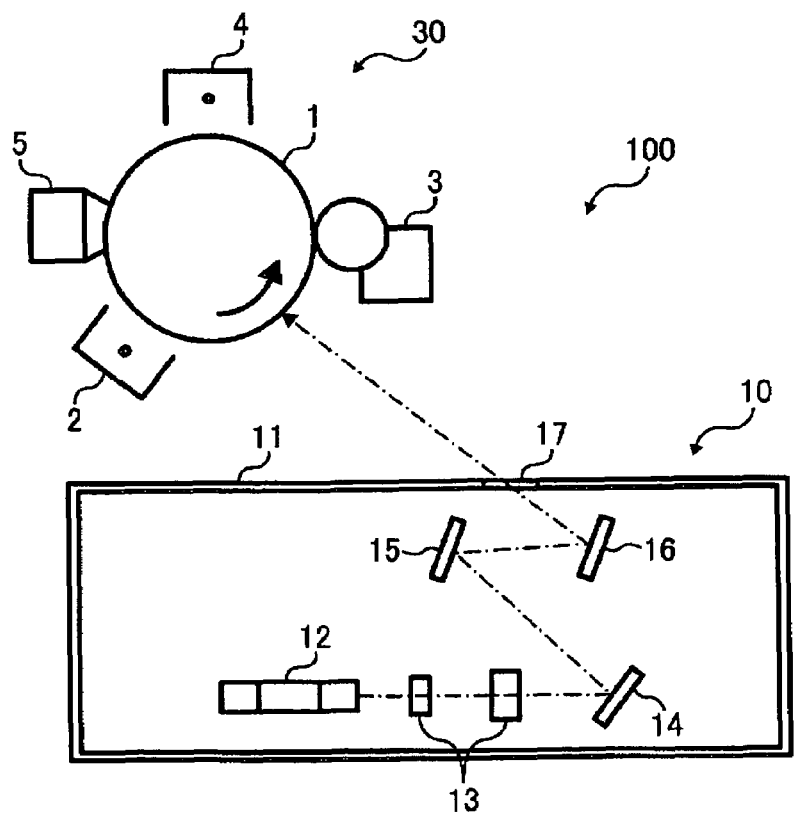
FIG. 2 is a schematic structure of a laser printer according to at least one example embodiment of the present invention.

Referring to FIG. 2, a schematic structure of a laser printer 100 according to an example embodiment of the present invention is described.

The laser printer 100 of FIG. 2 may serve as an image forming apparatus and includes an image forming unit 30 and an optical writing unit 10.

The image forming unit 30 may form a toner image and includes a photoconductive element 1, a charging unit 2, a developing unit 3, a transfer unit 4, and a cleaning unit 5.

The optical writing unit 10 may emit a laser light beam to expose or irradiate the photoconductive element 1 of the image forming unit 30 to form an electrostatic latent image on a surface of the photoconductive element 1.

As described above, the photoconductive element 1 receives the laser light beam and bears or carries a thus formed electrostatic latent image on the surface thereof. The photoconductive element 1 is rotated by a photoconductive element drive unit (not shown) in a counterclockwise direction, which is a direction indicated by an arrow in FIG. 2.

The charging unit 2 uniformly charges the surface of the photoconductive element 1.

The developing unit 3 develops the electrostatic latent image formed on the surface of the photoconductive element 1 to a visible toner image.

The transfer unit 4 is applied with a charge to transfer the toner image formed on the surface of the photoconductive element 1 onto a transfer member.

The cleaning unit 5 removes residual toner form the surface of the photoconductive element 1.

The optical writing unit 10 includes an optical housing 11 to accommodate a polygon mirror 12, and a plurality of optical elements such as a f-theta lens group 13, mirrors 14, 15, and 16, and a slit 17.

The polygon mirror 12 is rotated by a polygon motor 18 (see FIG. 3) to receive and deflect a laser light beam emitted from a semiconductor laser (not shown).

The f-theta lens group 13 serves as a group of optical elements to receive and refract the laser light beam.

The mirrors 14, 15, and 16 sequentially reflect the laser light beam from the f-theta lens group 13.

The slit 17 serves as an exit aperture or opening mounted on the optical housing 11 so that the laser light beam can pass therethrough toward the photoconductive element 1.

Operations of the laser printer 100 are described.

When the photoconductive element drive unit starts to rotate the photoconductive element 1, the charging unit 2 uniformly charges the surface of the photoconductive element 1. The optical writing unit 10 emits a laser light beam to form an electrostatic latent image on the surface of the photoconductive element 1. The developing unit 3 then develops the electrostatic latent image on the photoconductive element I to a visible toner image.

At the same time, a sheet feeding unit (not shown) provided in the laser printer 100 feeds and conveys a transfer sheet (not shown). When the transfer sheet is conveyed to the photoconductive element 1, the transfer unit 4 causes the toner image formed on the photoconductive element 1 to be transferred onto a surface of the transfer sheet. The toner image is fixed to the transfer sheet by a fixing unit (not shown) and is discharged to the outside of the laser printer 100.

After the toner image has been transferred onto the transfer sheet, the cleaning unit 5 removes residual toner remaining on the surface of the photoconductive element 1.

Detailed operations of the optical writing unit 10 are now described.

The polygon motor 18 drives the polygon mirror 12. A semiconductor laser (not shown) launches a laser light beam. The launched laser light beam passes through a collimator lens (not shown), a spherical lens (not shown), and a cylindrical lens (not shown), and reaches the polygon mirror 12.

The incident laser light beam is deflected by the polygon mirror 12, passes through the f-theta lens group 13, and is sequentially reflected by the mirrors 14, 15, and 16. After being reflected by the mirror 16, the laser light beam passes through the slit 17 in an obliquely upward direction to the outside of the optical writing unit 10 toward the photoconductive element 1. Then, the laser light beam is collected to the photoconductive element 1 so as to scan the surface of the photoconductive element 1 in its axial direction.

When the polygon mirror 12 is rotated in the above-described structure of FIG. 2, a turbulent flow may occur in the optical writing unit 10, which may cause powder dust and fine particles to stir up in the optical writing unit 10 and to contaminate surfaces of the polygon mirror 12.

If dust does not enter and reside in the optical housing 11 of the optical writing unit 10, the polygon mirror 12 may not be contaminated. It is, however, difficult or impossible to block or remove dust and particles from the optical housing 11 at the manufacturing stage. It is also difficult to form the optical housing 11 of the optical writing unit 10 in a closed shape that can completely shut out such dust and particles therefrom.

Figure 3:
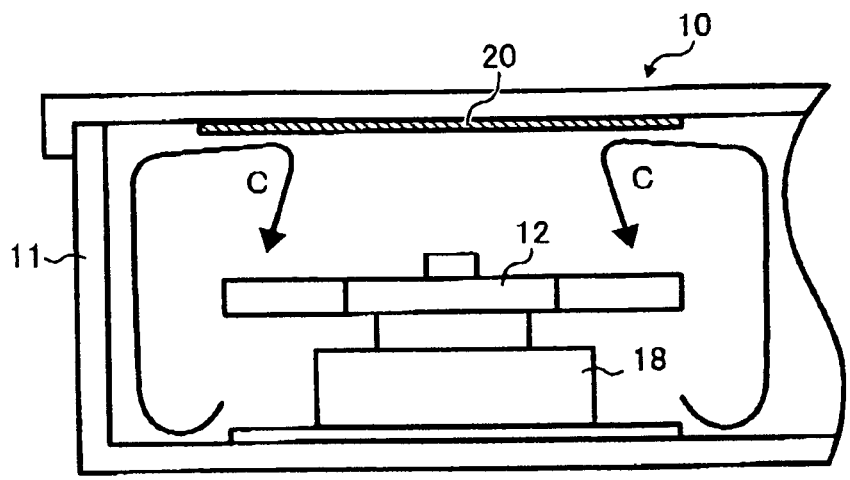
FIG. 3 is a schematic structure of an optical writing unit, included in the laser printer of FIG. 2, according to at least one example embodiment of the present invention.
Figure 4:
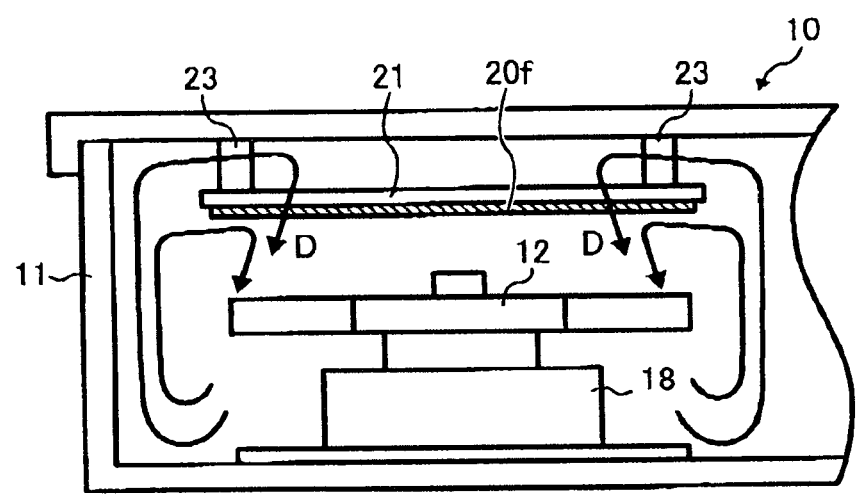
FIG. 4 is a schematic structure of a different example of the optical writing unit according to at least one example embodiment of the present invention.

Referring to FIGS. 3 and 4, schematic structures of the optical writing unit 10 according to example embodiments of the present invention are described.

In FIG. 3, the optical writing unit 10 further includes a collecting member 20.

The collecting member 20 may be directly mounted onto a top surface of the optical housing 11 of the optical writing unit 10, which is located in the vicinity of and over the polygon mirror 12.

The collecting member 20 may collect powder dust and fine particles that reside in the optical housing 11 of the optical writing unit 10 so that contamination on the polygon mirror 12 can be reduced if not prevented.

When the polygon mirror 12 is rotated in the optical writing unit 10 having the structure shown in FIG. 3, air in the optical housing 11 of the optical writing unit 10 may flow in a direction as indicated by arrow "C." Such powder dust and fine particles may be conveyed by the air that flows in the direction "C" and be collected by the collecting member 20. The collection of powder dust and fine particles by the collecting member 20 can reduce by a significant amount powder dust and fine particles that collide against and adhere to a plurality of surfaces of the polygon mirror 12. This may effectively reduce if not prevent contamination of the polygon mirror 12.

The collecting member 20 may be formed with a member that can collect and firmly keep dust and fine particles from leaving. For example, the collecting member 20 can include an electrostatically collecting member that is charged and that electrostatically attracts powder dust and fine particles and/or can include an adhesive member that causes dust and fine particles to be adhered thereto.

In FIG. 4, the optical writing unit 10 further includes an electrostatically collecting filter 20f that serves as the collecting member 20. The electrostatically collecting filter 20f may have permeability to air and be electrically charged.

Each of the electrostatically collecting filter 20f and the collecting member 20 may indirectly be mounted on the optical housing 11 of the optical writing unit 10. Specifically, the electrostatically collecting filter 20f may be mounted on a frame 21, which is supported by legs 23 that are attached to the optical housing 11 of the optical writing unit 10. The electrostatically collecting filter 20f may be located in the vicinity of and over the polygon mirror 12 in a manner such as the collecting member 20 is shown in FIG. 3.

The electrostatically collecting member 20f with the above-described structure may also collect powder dust and fine particles that reside in the optical housing 11 of the optical writing unit 10 so that contamination on the polygon mirror 12 can be reduced if not prevented.

When the polygon mirror 12 is rotated in the optical writing unit 10 having the structure shown in FIG. 4, air in the optical housing 11 of the optical writing unit 10 may flow in a direction as indicated by arrow "D." As the air passes through the electrostatically collecting filter 20f, the powder dust and fine particles may be collected thereby.

Figure 5:
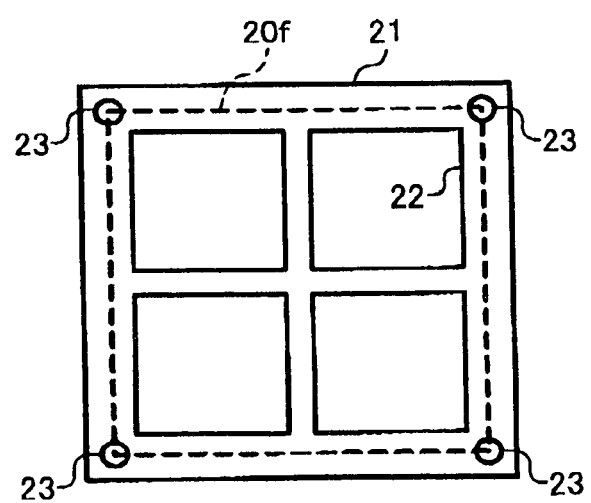
FIG. 5 is a structure of a frame and a collecting member provided to the optical writing unit according to at least one example embodiment of the present invention.

Referring to FIG. 5, a structure of the frame 21 of FIG. 4 is described.

The frame 21 may include a plurality of openings 22 to let air through, as shown in FIG. 5. The electrostatically collecting filter 20f may be mounted so as to cover the plurality of openings 22 of the frame 21.

The frame 21 and the electrostatically collecting filter 20f may be integrally molded. This can skip one step in the manufacturing stage for attaching the electrostatically collecting filter 20f to the frame 21, which can significantly contribute to cost reduction.

As previously described, the air in the optical housing 11 of the optical writing unit 10 may flow in the direction "D", and powder dust and fine particles may be conveyed by the air that flows in the direction "D." As the air passes through the electrostatically collecting filter 20f attached to the frame 21 that is mounted on the optical housing 11, the powder dust and fine particles may be collected thereby. The collection of dust by the electrostatically collecting filter 20f serving as the collecting member 20 can reduce a great amount of powder dust and fine particles that collide against and adhere to a plurality of surfaces of the polygon mirror 12. Similar to the collecting member 20 provided to the structure shown in FIG. 3, the electrostatically collecting filter 20f provided to the structure shown in FIG. 4 may effectively reduce if not prevent contamination of the polygon mirror 12.

In FIG. 4, the electrostatically collecting filter 20f is mounted on the top surface or a ceiling of the optical housing 11 provided with a gap therebetween. However, similar to the collecting member 20 shown in FIG. 3, the optical housing 11 can have a structure in which the electrostatically collecting filter 20f shown in FIG. 4 can be directly mounted on the top surface of the optical housing 11.

Further, the electrostatically collecting filter 20f can be mounted on a different surface, instead of the top surface, of the optical housing 11, directly or with a gap therebetween.

Further, the collecting member 20 including the electrostatically collecting filter 20f can be mounted on a cover (not shown) that may detachably be attached to the optical housing 11 of the optical writing unit 10. With the above-described structure, the collecting member 20 including the electrostatically collecting filter 20f can easily be cleaned or replaced.

Figure 6:
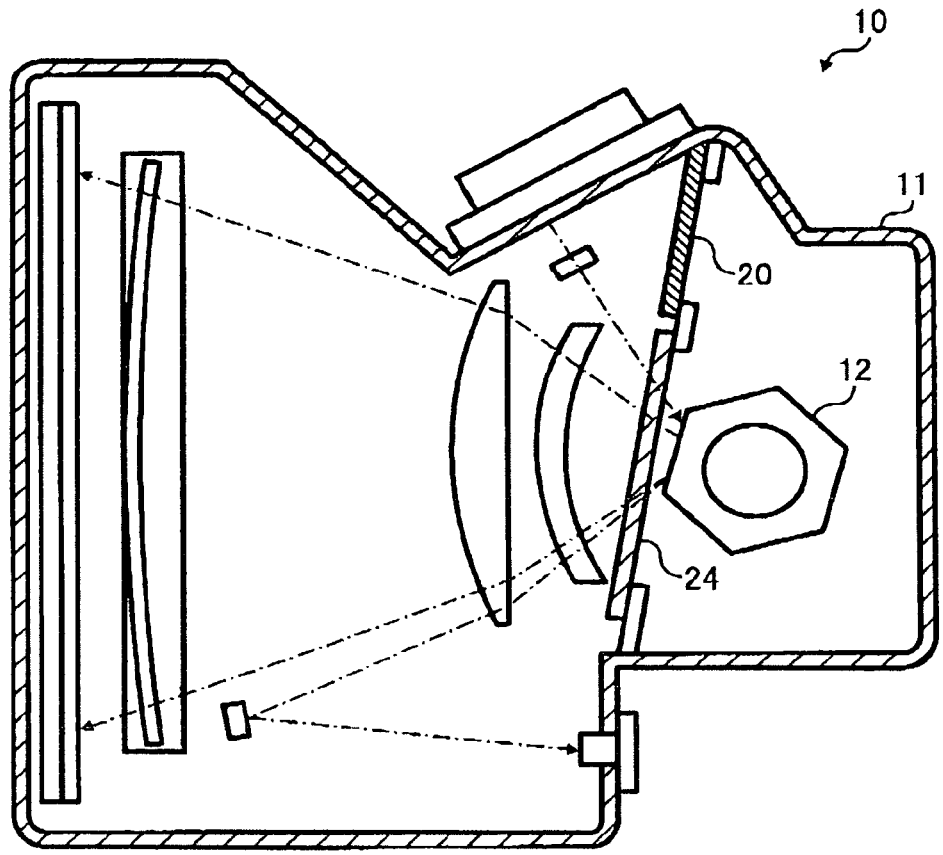
FIG. 6 is a schematic structure of a different example of the optical writing unit according to at least one example embodiment of the present invention.
Figure 7:
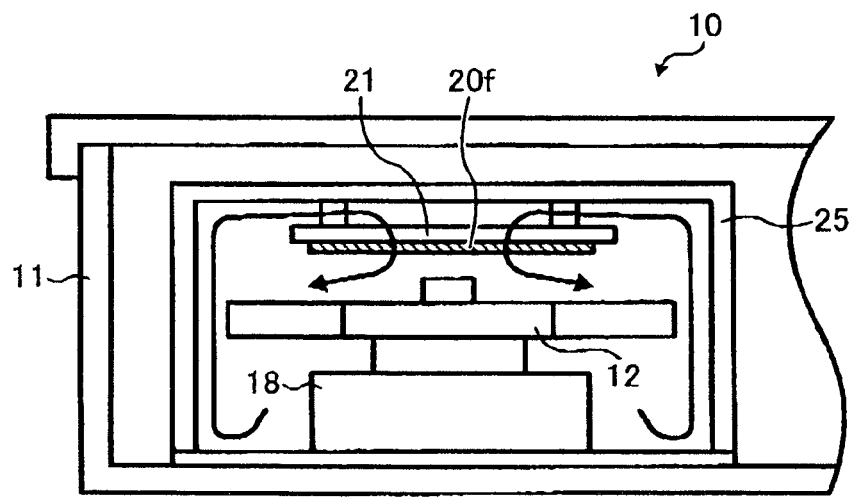
FIG. 7 is a schematic structure of a different example of the optical writing unit according to at least one example embodiment of the present invention.
Figure 8:
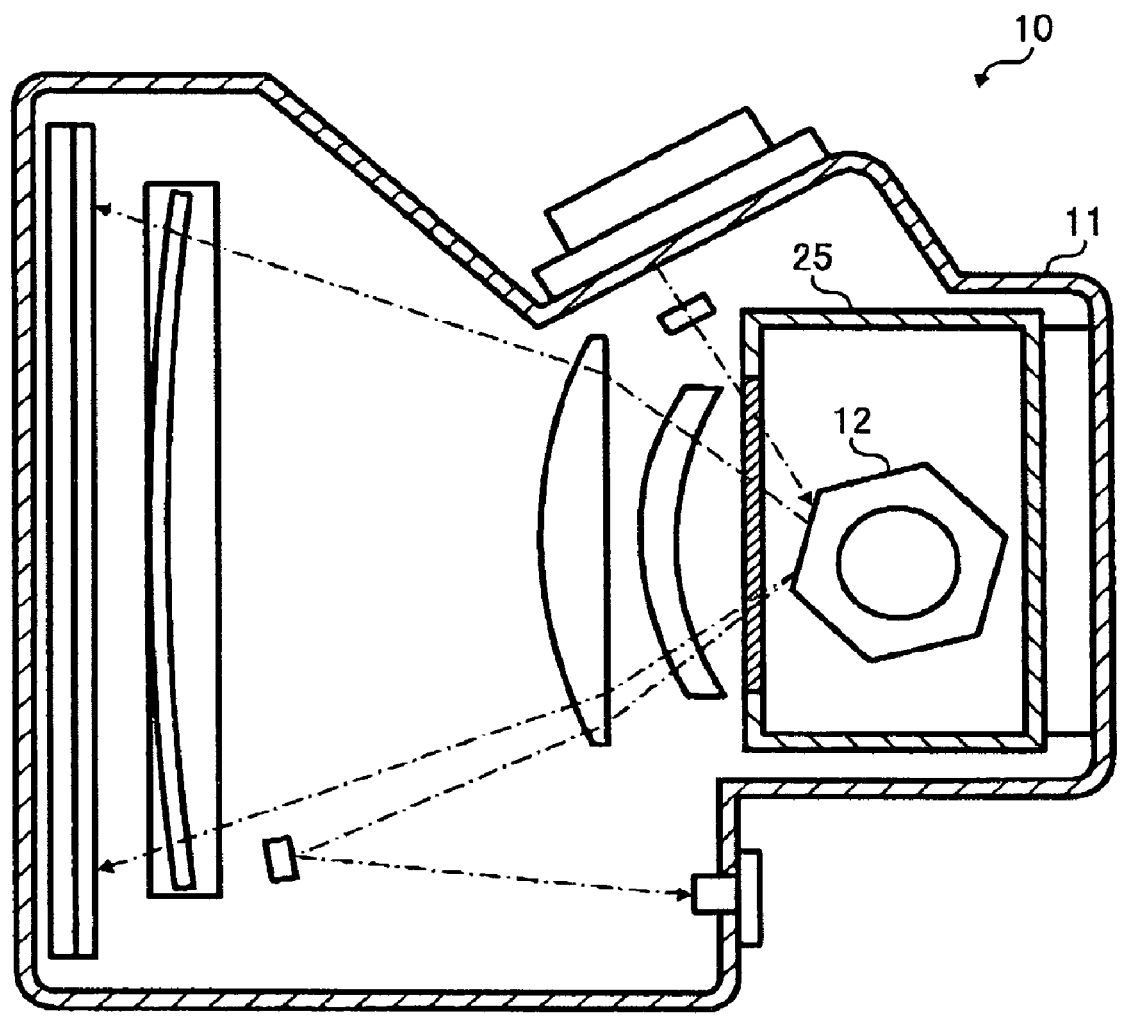
FIG. 8 is a schematic structure of a different example of the optical writing unit according to at least one example embodiment of the present invention.

Referring now to FIGS. 6, 7, and 8, alternative structures of the optical writing unit 10 according to at least one example embodiment of the present invention are described.

There are various types of structures for the optical writing unit 10. For example, the structures shown in FIGS. 3 and 4 have one section in the optical housing 11. That is, an inside portion of the optical housing 11 is not divided, thereby the polygon mirror 12 with other optical elements are accommodated in the same section in the inside portion.

On the other hand, the optical housing 11 of the optical writing unit 10 may have a structure as shown in FIG. 6. In the optical writing unit 10 shown in FIG. 6, the optical housing 11 is separated or divided by a separation plate 24, which serves as a separator, into two sections. That is, one section may accommodate the polygon mirror 12 and the polygon motor 18 (not shown in FIG. 6), and the other section may accommodate the other optical elements provided in the optical writing unit 10.

Further, the optical housing 11 of the optical writing unit 10 may have structures as shown in FIGS. 7 and 8 so that the polygon mirror 12 can be sufficiently closed in a box 25.

Both the collecting member 20 and the electrostatically collecting filter 20f according to at least one example embodiment of the present invention can be applied to each type of the optical writing unit 10.

Further, in the optical writing unit 10 having the structure shown in FIG. 6, the collecting member 20 including the electrostatically collecting filter 20f may be mounted on a surface of the separation plate 24 other than a transparent portion (not shown) through which the laser light beam may pass.

As previously described, the optical writing unit 10 having the structures shown in FIGS. 7 and 8 may include the polygon mirror 12 in the box 25 in the optical housing 11 so as to separate the polygon mirror 12 from other optical elements. In the above-described structure, the polygon mirror 12 may be placed and covered in a small space by the box 25, and the collecting member 20 including the electrostatically collecting filter 20f may be mounted in the box 25. With the above-described structure, powder dust and fine particles that reside in the box 25 can surely be collected. Thereby, the contamination of the polygon mirror 12 can more effectively be reduced if not prevented.

The above-described example embodiments are illustrative, and numerous additional modifications and variations are possible in light of the above teachings. For example, elements and/or features of different example embodiments herein may be combined with each other and/or substituted for each other within the scope of this disclosure and appended claims. It is therefore to be understood that within the scope of the appended claims, the disclosure of this patent specification may be practiced otherwise than as specifically described herein.

What is claimed:

1. An optical writing unit comprising:
   a housing within which are disposed additional components of the optical writing unit including the following,
   a plurality of optical elements,
   a polygon mirror configured to deflect a laser light beam,
   legs extending from a top surface of the housing,
   a frame attached to the legs, the frame being disposed at a position above the polygon mirror and facing the polygon mirror, a gap being formed between the frame supported by the legs and the top surface of the housing, and
   a collecting member mounted on the frame and configured to collect dust in the housing, wherein
      the frame is at least one of flat and plate-shaped and includes an opening, and
      the collecting member is mounted on the frame to cover the opening.

2. The optical writing unit according to claim 1, wherein: the collecting member includes an electrostatically charged collecting member.

3. The optical writing unit according to claim 1, wherein: the collecting member includes an adhesive member.

4. The optical writing unit according to claim 1, wherein: the collecting member and the frame are integrally molded.

5. The optical writing unit according to claim 1, wherein: the polygon mirror and the plurality of optical elements are arranged in a same section in the housing.

6. An image forming apparatus comprising the optical writing unit according to claim 1.

7. An optical writing unit comprising:
   a housing within which additional components of the optical writing unit are disposed, the housing including:
   a plurality of optical elements:
      a polygon mirror configured to deflect a laser light beam;
      legs extending from a cover of the housing;
      a frame attached to the legs, the frame being disposed at a position above the polygon mirror and facing the polygon mirror;
      a gap being formed between the frame supported by the legs and the cover; and
      a collecting member mounted on the frame and configured to collect dust in the housing, wherein
         the frame is at least one of flat and plate-shaped and includes an opening, and
         the collecting member is mounted on the frame to cover the opening.

8. An image forming apparatus comprising the optical writing unit according to claim 7.

9. An optical writing unit comprising:
   a housing within which are disposed additional components of the optical writing unit including the following,
   a plurality of optical elements,
   a polygon mirror configured to deflect a laser light beam,
   legs extending from a top surface of the housing,
   a frame attached to the legs, the frame being disposed at a position above the polygon mirror and facing the polygon mirror, a gap being formed between the frame supported by the legs and the top surface of the housing, and
   collecting means mounted on the frame and configured for collecting dust in the housing, wherein
      the frame is at least one of flat and plate-shaped and includes an opening, and
      the collecting means covers the opening.

* * * * *